United States Patent [19]
West

[11] 3,714,503
[45] Jan. 30, 1973

[54] RESONANT ENERGY RECOVERY TYPE CRT DEFLECTION CIRCUIT

[75] Inventor: Roger F. West, Weston, Conn.

[73] Assignee: United Aircraft Corporation, East Hartford, Conn.

[22] Filed: Dec. 21, 1970

[21] Appl. No.: 100,232

[52] U.S. Cl. ................................315/27 TD, 315/29
[51] Int. Cl. .................................................H01j 29/70
[58] Field of Search .....315/27 TD, 27 GD, 27 R, 28, 315/29

[56] References Cited

UNITED STATES PATENTS

| | | | |
|---|---|---|---|
| 3,179,843 | 4/1965 | Schwartz | 315/27 TD |
| 3,426,245 | 2/1969 | Yorasek et al. | 315/27 TD |
| 3,467,882 | 9/1969 | Young | 315/27 TD |

Primary Examiner—Carl D. Quarforth
Assistant Examiner—J. M. Potenza
Attorney—Melvin Pearson Williams

[57] ABSTRACT

A winding coupled to the input choke of a resonant energy recovery type deflection circuit with a disconnect diode in series with the choke enables use of a power supply voltage for the circuit which is much lower than what has heretofore been required due to the need to maintain sweep current and flyback voltage at acceptable levels. Another embodiment includes a transductor and a difference amplifier to regulate the deflection circuit yoke capacitor voltage so that raster size remains constant. The circuit is thereby immune to component and power supply voltage variations. Both embodiments utilize mostly elements which are substantially non-dissipative.

5 Claims, 3 Drawing Figures

INVENTOR
ROGER F. WEST
BY Melvin Pearson Williams
ATTORNEY

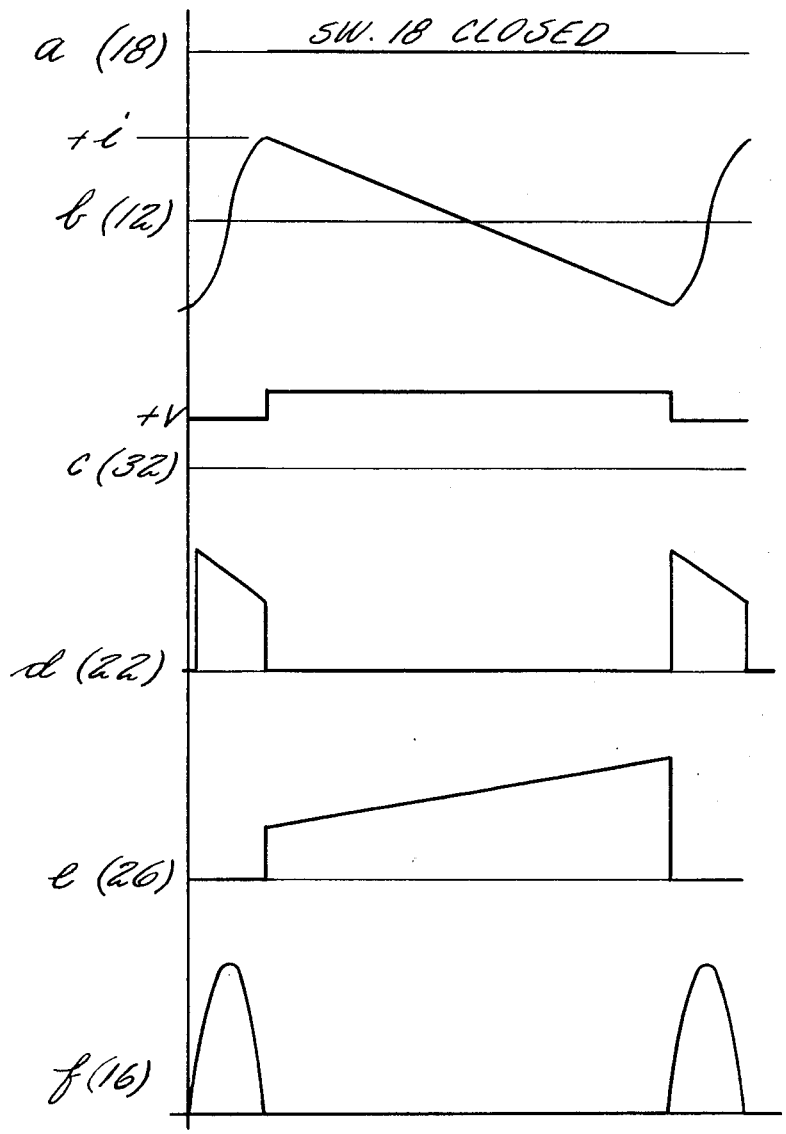

RESONANT ENERGY RECOVERY TYPE CRT DEFLECTION CIRCUIT

BACKGROUND OF THE INVENTION

1. Field of Invention

This invention relates to cathode ray tube deflection circuitry, and more particularly to improvements in coupling energy from a low voltage power supply into a CRT resonant energy recovery circuit and stabilizing the circuit against changes in power supply voltage or component variation.

2. Description of the Prior Art

The resonant energy recovery deflection circuit is one of the best known circuits for generating a television raster with a magnetic yoke deflection system. The principal elements of the deflection circuit are a yoke in series with a large capacitor, herein referred to as a yoke capacitor. The yoke capacitor provides a substantially constant voltage (equal to the power supply voltage) across the yoke, thereby causing a linear ramp of current in the yoke. The yoke capacitor is sufficiently large so that its voltage remains substantially constant during the sweep time. A small, retrace capacitor is connected across both of these elements. During the sweep time, the retrace capacitor is shorted by a switch, but during retrace time, the switch is left open and the retrace capacitor and the yoke form a resonant circuit. The yoke capacitor is sufficiently large so that it is not a factor in effecting the frequency of resonance. The frequency is sufficiently high so that the yoke current can change from a maximum value in one direction to a maximum value in the opposite direction during the retrace time.

All of the elements described hereinbefore are ideally non-dissipative. The only power which must be supplied to the circuit is to make up for losses in the components because they are real, and not ideal. Energy is fed into the circuit from the power supply through an input choke. During the sweep portion of the cycle, the input choke is connected across the power supply (through the closed switch) permitting energy to be stored in the choke. During the retrace portion of the cycle some of the energy stored in the choke is used to make up for losses in the rest of the deflection system.

For typical resonant energy recovery deflection circuits, the switch comprises a transistor and a diode. When the switch is closed, peak currents are usually several amperes; when the switch is open, peak voltages are in the order of several hundred volts. Limitations of current and voltage handling capability of the switch determine the yoke inductance and the value of power supply voltage. Sweep current amplitude is determined by power supply voltage and yoke inductance. In prior art circuits, in order to store sufficient energy in the yoke for peak deflection, the power supply voltage, which must be equal to the voltage across the yoke capacitor, has to be relatively high compared to voltages commonly used for other semiconductor circuits. If, instead, a low voltage were used with a yoke having lower inductance, then the current becomes quite high.

SUMMARY OF THE INVENTION

The primary object of the present invention is to provide an improved resonant energy recovery CRT deflection circuit operable from power supply voltages commonly encountered in semiconductor circuits.

Another object of the invention is to stabilize a resonant energy recovery circuit with respect to variations in supply power and component parameters.

In accordance with the present invention, the input choke of a resonant energy recovery deflection circuit has a second winding coupled thereto, the winding coupling high voltage into the choke, thereby permitting use of a low voltage power supply. In further accord with the present invention, the second coil is operated by switch means in synchronism with the operation of the deflection circuit.

According to the present invention, regulating the voltage across a yoke driving capacitor in series with the yoke will stabilize the deflection circuit against changes in power supply voltage and component variation.

The present invention makes it possible to use one power supply for both the deflection circuit and the semiconductor circuitry in other parts of a display system. The invention in accordance herewith will keep the generated raster from changing size due to power supply and component variations. Since the improved circuit is simple and straightforward, it is capable of implementation at low cost and with high reliability utilizing mainly non-dissipative components.

The foregoing and other objects, features and advantages of the present invention will become more apparent in the light of the following detailed description of preferred embodiments thereof as illustrated in the accompanying drawings.

BRIEF DESCRIPTION OF THE DRAWING

FIG. 2 is an illustration of the different voltage and current relationships in the circuitry illustrated in FIG. 1 during different time intervals throughout a cycle of operation.

DESCRIPTION OF THE PREFERRED EMBODIMENT

Figure 1:
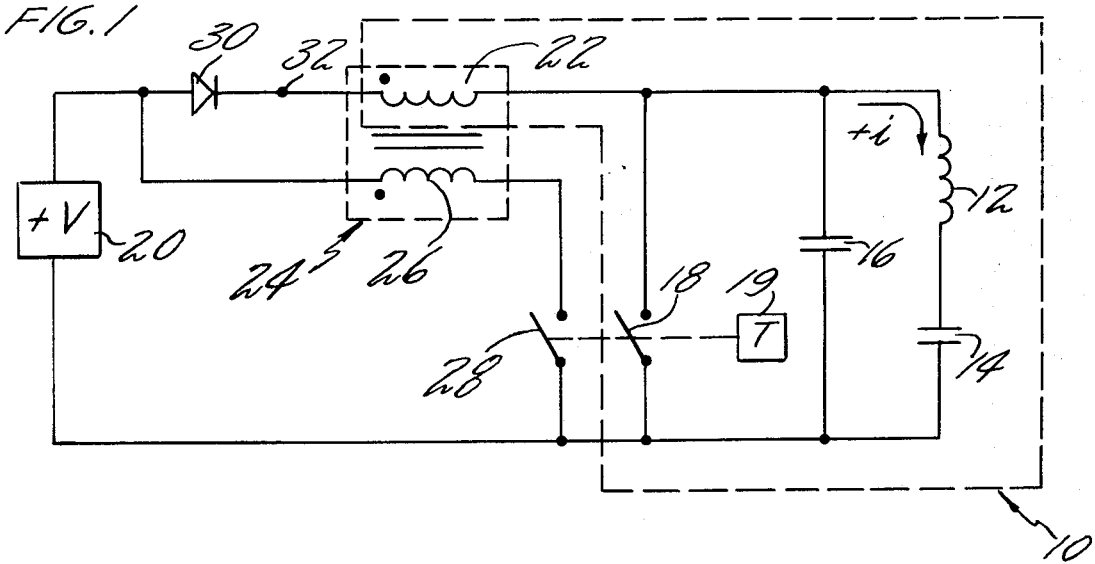
FIG. 1 is a schematic diagram of a preferred embodiment of the present invention.

Referring now to FIG. 1, a conventional resonant energy CRT deflection circuit 10 of the type heretofore known to the art includes a deflection yoke 12 and a yoke capacitor 14 which provides the current to drive the yoke 12. Connected across the yoke 12 and the capacitor 14 is a retrace capacitor 16, which is periodically short-circuited by suitable electronic switch means such as illustrated by a switch 18, which may be operated in a well-known fashion in response to suitable timing means 19. In prior art deflection circuits, power is applied from a source 20 for positive DC potential through an input choke 22. The yoke capacitor 14 is very large, and since no average DC potential can be sustained across the choke 22 or the yoke 12, the yoke capacitor 14 will assume substantially the voltage of the source 20.

During retrace, the switch 18 is opened and the energy in the yoke 12 is transferred to the retrace capacitor 16. At the middle of retrace, all of the energy formerly in the yoke 12 is in the retrace capacitor 16, so it is at its peak voltage (illustration $f$, FIG. 2). During the second half of retrace, all the energy in the capacitor 16 is transferred back into the yoke 12. At this time, the switch 18 is closed (commencement of forward sweep), and the energy in the yoke 12 is returned to the yoke capacitor 14 as a positive linearly decreasing current flows through the yoke 12. At the center of sweep, the current is zero and the energy in the yoke 12 is zero. But the voltage on the yoke capacitor 14 is still across the yoke 12, so a negative current builds up linearly during the second half of the sweep until the switch 18 is opened.

The capacitor 16 must be chosen with respect to the inductance of the yoke 12 to have a resonant frequency of the two for which the half-period is substantially equal to the retrace period; this provides substantially zero volts across the capacitor 16 at the time the switch 18 is closed, so that there are no transient effects.

An improvement in accordance with the present invention comprises incorporating the input choke 22 in a transfer 24 including a second coil 26 connected in series with a second switch 28 across the potential source 20. Additionally, a diode 30 is connected between the source 20 and the choke 22. The switch 28 operates in synchronism with the switch 18, so that both are open or closed at the same time. The coil 26 has a fewer number of turns than the coil 22, so that when the switch 28 is closed, a high voltage is coupled into the choke 22 (illustration c, FIG. 2), thereby back-biasing the diode 30 which isolates the source 20 from the high voltage on the choke 22. The voltage at the junction 32 of the diode 30 with the choke 22 is a multiple of the voltage of the source 20, related to the ratio of turns of the choke 22 to the number of turns in the coil 26. This applies a significantly higher potential to the series combination of the yoke 12 and the yoke capacitor 14, so that the yoke capacitor 14 can operate at a higher potential than that of the source 20. Thus, a high potential for driving the yoke 12 is achieved without having an equally high potential at the source 20; the source 20 can therefore be of a much lower potential, commensurate with the supply voltage requirements of other components in related circuitry.

When the switches 18, 28 are open, there can be no flow of current through the coil 26 (illustration e, FIG. 2), and the current in the choke 22 (illustration d, FIG. 2) will be a submultiple of the current which had been flowing in the coil 26 just prior to opening the switch 28. This current will be related to the ratio of the number of turns in the coil 26 to the number of turns in the choke 22.

An essential feature of the present invention is that the positive DC potential V may be of lower value than prior art would permit. The average value of the voltage on the capacitor 14 determines current amplitude and raster size. This voltage is equal to the average DC potential at the junction 32; that is, the time weighted average of DC potential V during retrace time and the DC potential V multiplied by the turns ratio of the choke 22 to the coil 26 during raster sweep time.

Figure 3:
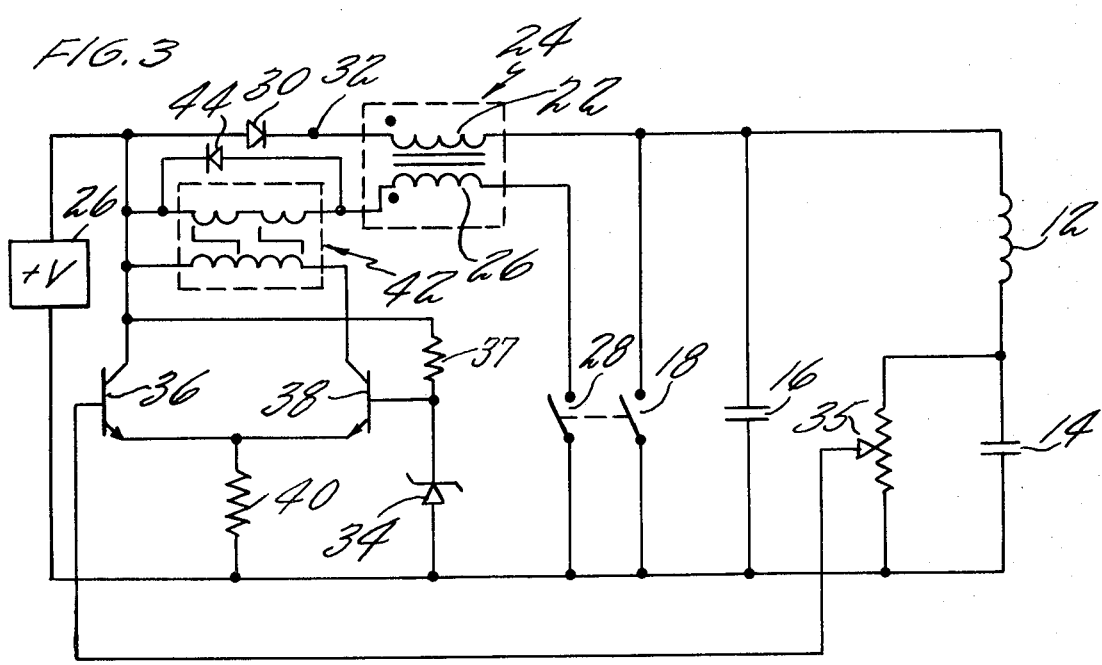
FIG. 3 is a schematic diagram illustrating a second embodiment of the invention.

Referring now to a further embodiment shown in FIG. 3, a voltage regulator compares a fraction of voltage across the yoke capacitor 14 to a fixed reference voltage established by a zener diode 34. The current through the zener diode is developed by the source 20 through a resistor 37. A potentiometer 35 across the yoke capacitor 14 provides a fraction of the voltage across the yoke capacitor 14 for comparison with the reference voltage. Two transistors 36, 38 are connected as a differential amplifier, with a resistor 40 connected to both emitters of the transistors 36, 38 to provide a path for bias current. When the voltage at the base of the transistor 36 (which is connected to the potentiometer 35) tends to increase, the differential amplifier will cause a reduced current in the control winding, and so an increased drop across a transductor 42 (or saturable transformer), thereby providing less voltage to the coil 26. This will tend to decrease the voltage across the yoke capacitor 14 until the fraction being regulated is substantially identical to the voltage across the zener diode 34. A diode 44 is provided across the transductor 42 to prevent a large flyback pulse when the switch 28 is opened.

Thus, another feature of my invention is regulating the voltage across the yoke capacitor 14 (which determines the maximum current that will flow in the yoke 18) at a substantially constant average value to thereby stabilize the entire deflection system against changes in power supply voltage and all other component variations except yoke inductance. A further feature of my invention is that the voltage across the yoke capacitor 14 is regulated in a non-dissipative manner.

Although the invention has been shown and described with respect to preferred embodiments thereof, it should be understood by those skilled in the art that various changes and omissions in the form and detail thereof may be made therein without departing from the spirit and scope of the invention.

Having thus described typical embodiments of my invention, that which I claim as new and desire to secure by Letters Pat. of the United States is:

1. Yoke deflection current generating means operative in response to a source of DC potential and timing means defining raster sweep and retrace times comprising:
   a resonant energy recovery deflection circuit including an input choke connected to the source of DC potential;
   a coil inductively coupled to said input choke;
   switch means responsive to said timing means for connecting said coil to the source of DC potential during raster sweep time, said coil inducing a voltage in said choke; and
   isolation means responsive to voltage induced in said choke by said coil for disconnecting said input choke from said DC potential during raster sweep time.

2. Yoke deflection current generating means according to claim 1 wherein:
   said isolation means comprises a diode connected between the source of DC potential and said choke.

3. Yoke deflection current generating means according to claim 1 wherein said resonant energy deflection circuit additionally comprises:
   a yoke;
   a retrace capacitor connected to said yoke for storing energy provided by said yoke and substantially returning the energy to the yoke during the retrace time;
   a yoke capacitor connected in series with said retrace capacitor and said yoke for substantially receiving the energy from said yoke during the first half of the raster sweep time and substantially returning the energy to said yoke during the second half of the raster sweep time; and means responsive to said timing means for shorting said retrace capacitor during the raster sweep time.

4. Yoke deflection current generating means operative in response to a source of DC potential comprising:

a resonant energy recovery deflection circuit having a yoke with a yoke capacitor connected in series with said yoke;

means including a coil for coupling energy from the source of DC potential into said resonant energy recovery deflection circuit; and means connected in series with said coil and responsive to the voltage across said yoke capacitor for regulating the voltage across said coil with respect to the voltage of the source of DC potential, thereby to maintain raster size substantially constant, comprising a transductor in series with the coil, a difference amplifier including a reference voltage input to drive the input winding of the transductor, and means connecting a fraction of the potential across said yoke capacitor to said difference amplifier so that the current driving transductor is a function of the difference between the fraction of the potential across said yoke capacitor and the reference voltage.

5. Yoke deflection current generating means operative in response to a source of DC potential comprising:

a resonant energy recovery deflection circuit having a yoke with a yoke capacitor connected in series with said yoke;

means including a coil for coupling energy from the source of DC potential into said resonant energy recovery deflection circuit; and means connected in series with said coil and responsive to the voltage across said yoke capacitor for regulating the voltage across said coil with respect to the voltage of the source of DC potential, thereby to maintain raster size substantially constant, comprising a transductor in series with the coil, a reference voltage source, means providing a voltage proportional to the voltage across said yoke capacitor, and a difference amplifier for driving said transductor, one input of said difference amplifier being connected to said reference source and the other input to said difference amplifier being connected to said means providing a voltage proportional to the voltage across said yoke capacitor, whereby the current driving said transductor is a function of the difference between the reference voltage and the voltage proportional to the voltage on said yoke capacitor.

* * * * *